April 2, 1940.  A. DEL SIGNORE  2,195,686
OVEN
Filed Nov. 16, 1938  4 Sheets-Sheet 1
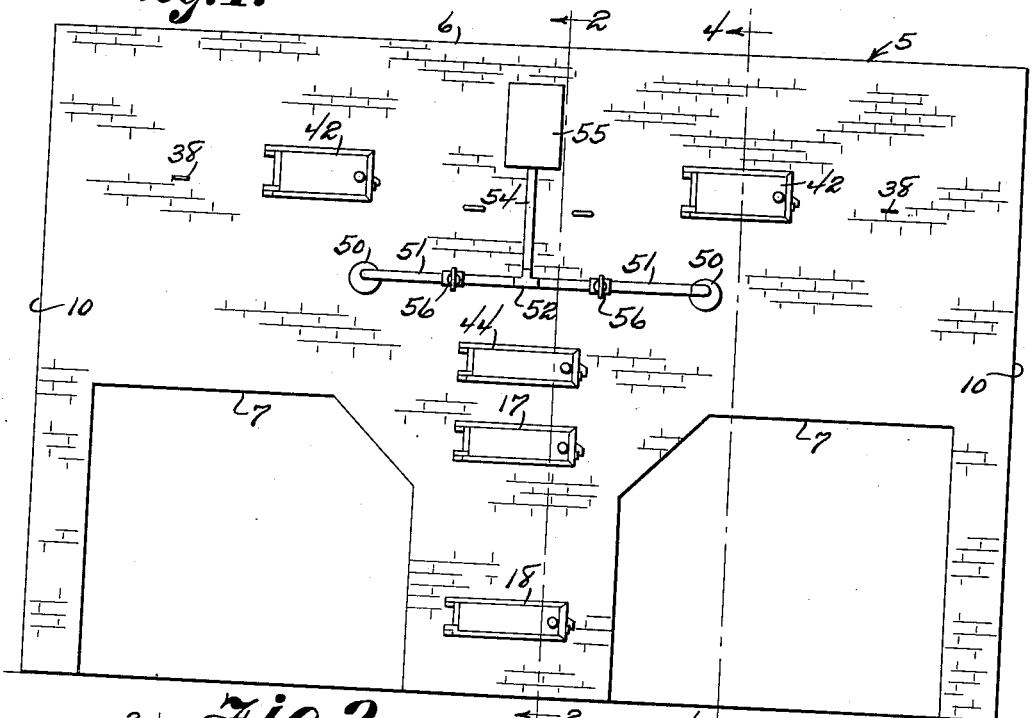
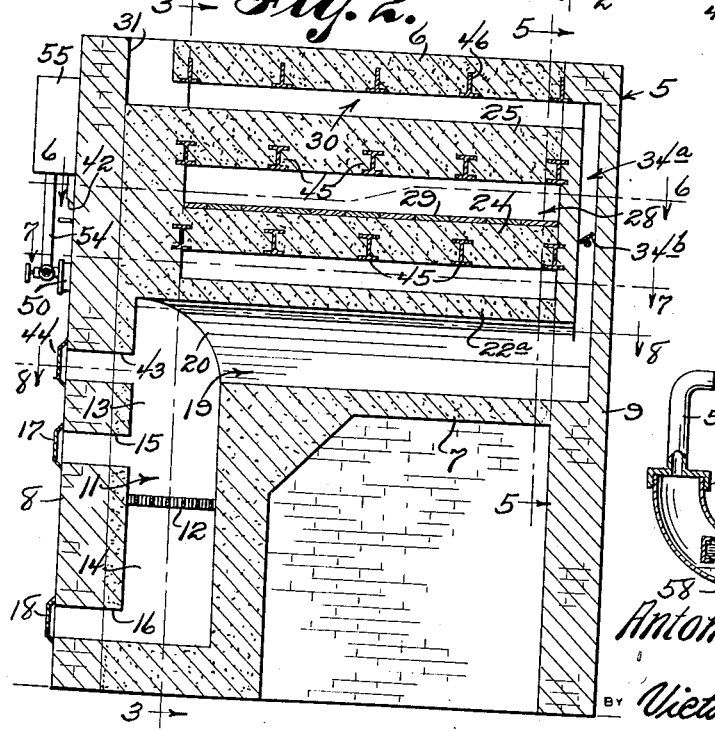
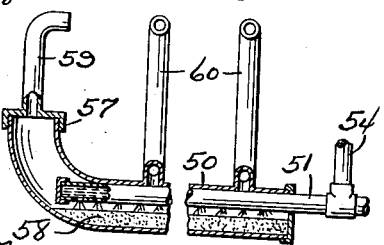
Antonio Del Signore
INVENTOR
BY Victor J. Evans & Co.
ATTORNEYS

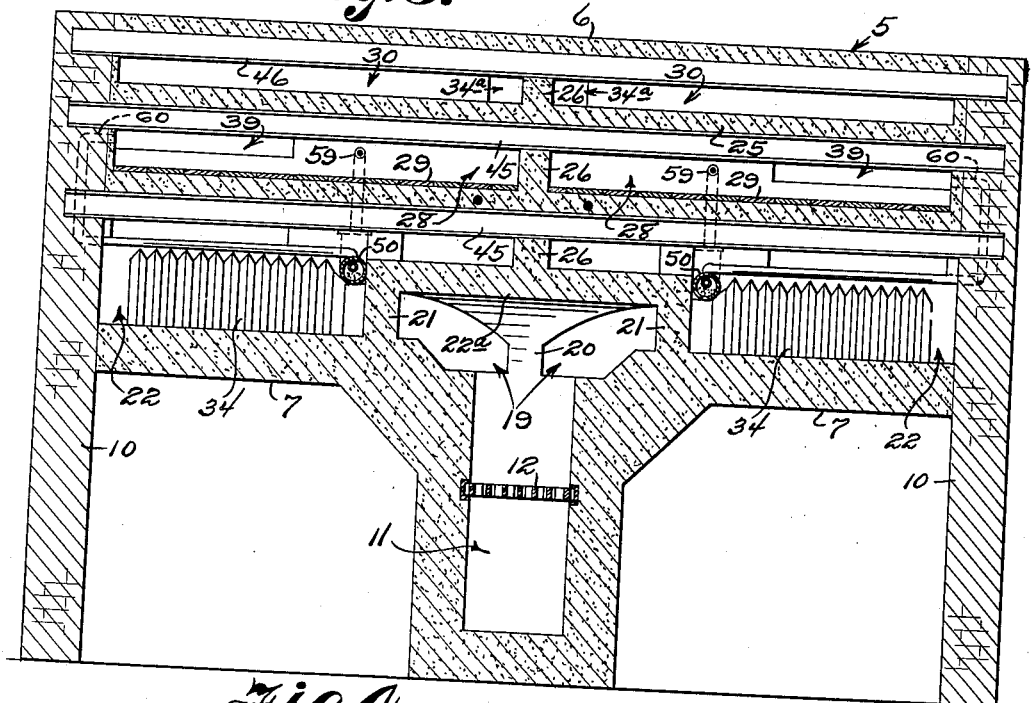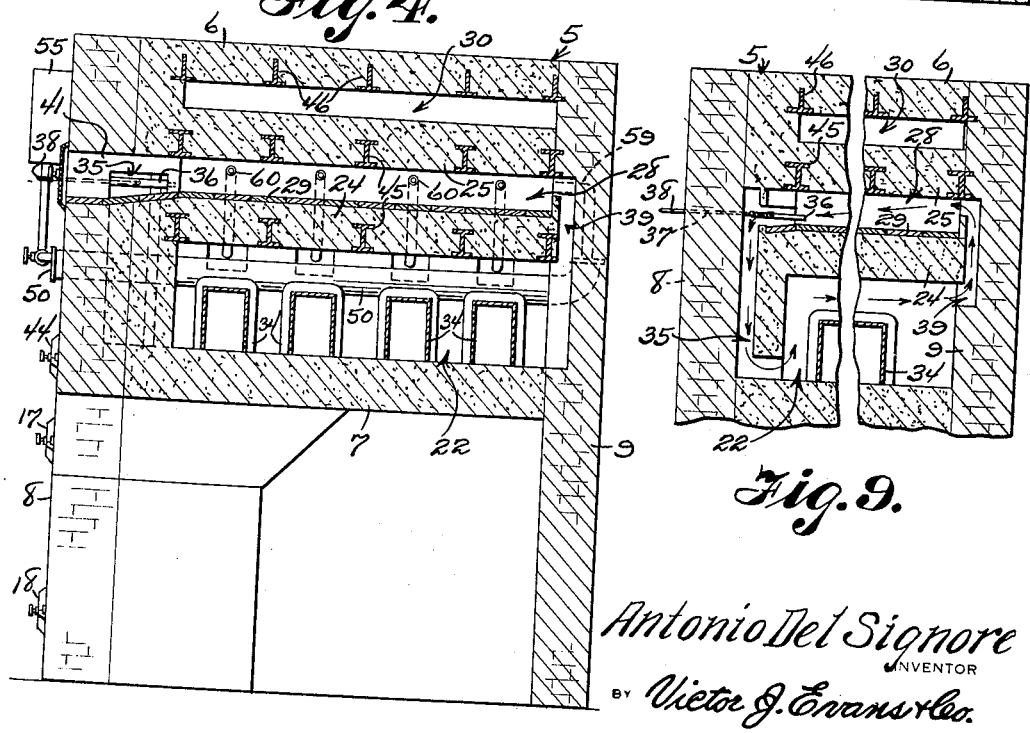

April 2, 1940.  A. DEL SIGNORE  2,195,686

OVEN

Filed Nov. 16, 1938  4 Sheets-Sheet 3

Antonio Del Signore
INVENTOR

BY Victor J. Evans & Co.
ATTORNEYS

April 2, 1940.　　　A. DEL SIGNORE　　　2,195,686
OVEN
Filed Nov. 16, 1938　　　4 Sheets-Sheet 4
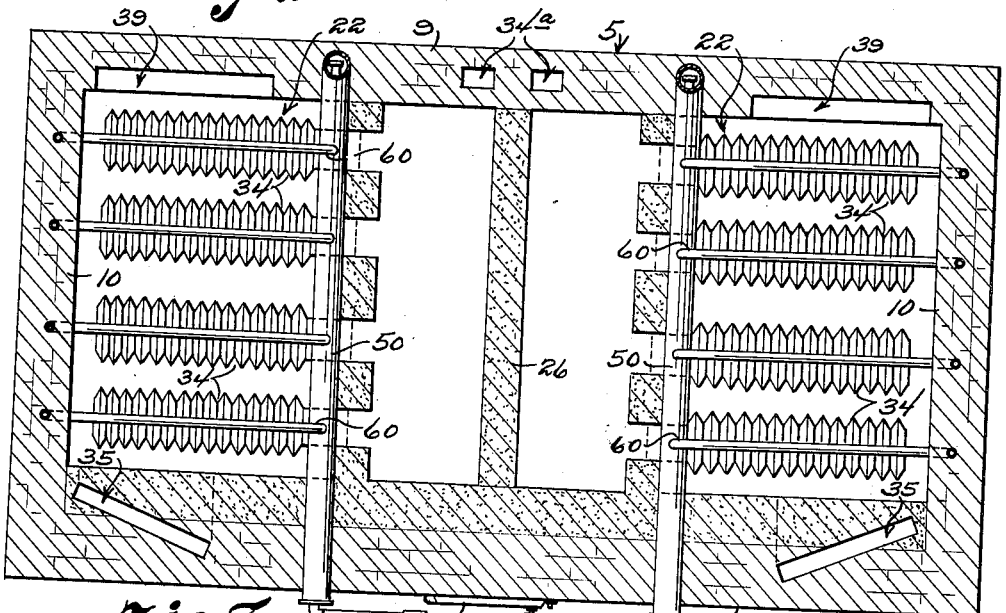
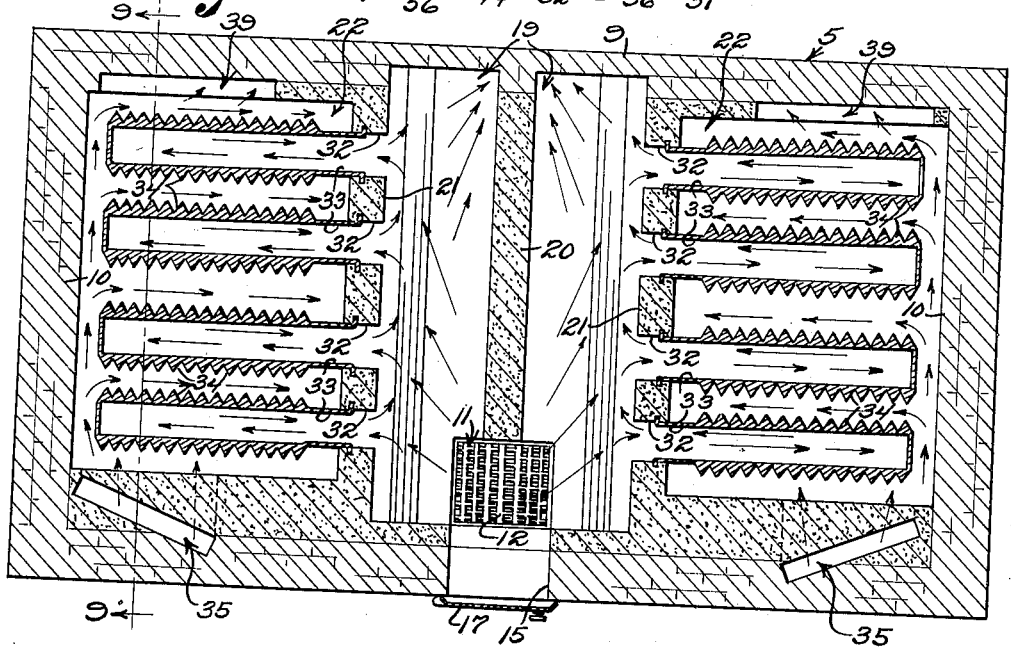
Antonio Del Signore
INVENTOR
BY Victor J. Evans & Co.
ATTORNEYS Patented Apr. 2, 1940

2,195,686

UNITED STATES PATENT OFFICE 2,195,686

OVEN

Antonio Del Signore, Boston, Mass.

Application November 16, 1938, Serial No. 240,830

6 Claims. (Cl. 107—63)

My invention relates to ovens and has as one of the principal objects thereof the provision of a baker's oven so constructed and arranged as to effect uniform heating of the baking chambers in a manner to eliminate so called hot and cold spots.

Another principal object of my invention is to provide an oven of the character described which is adapted to be heated by hot air in a manner to preclude gases or smoke from entering the baking chambers.

A further principal object of my invention is to provide an oven of the character described so constructed and arranged as to maintain the hot air continuously circulating between the hot chambers and the baking chambers therein without passing to the atmosphere unless the escape of said hot air is desired.

Another object of my invention is to provide an oven of the above described character equipped with means whereby heat may be maintained therein over considerable long periods of time after the fire has been drawn or banked thereby effecting a quick heating of the oven upon refiring to a desired temperature.

A further object of my invention is to provide an oven of the above described character equipped with means for generating steam for the baking chambers.

An important object of my invention is to provide an oven equipped with a plurality of radiators for receiving and maintaining heated air whereby to maintain the baking chambers in a heated condition over considerable periods of time after the fire has been drawn or banked.

Another important object of my invention is to provide an oven wherein the flues or conduits for conducting the heated air through and about the baking chambers are so arranged as to evenly distribute said heated air in a manner to eliminate hot and cold spots within said baking chambers.

A special object of my invention is to provide an oven of the character described which is simple in construction, efficient in operation, durable in use and economical in maintenance.

Another special object of my invention is to provide a steam generating unit adaptable for attachment to a baker's oven and operable through the medium of the oven fire for generating steam for the baking chambers.

Other objects and advantages will be apparent from the following description, appended claims and annexed drawings.

Referring to the drawings wherein like reference characters designate like parts throughout the several views:

Figure 1 is a front elevation of my invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 1.

Figure 5:
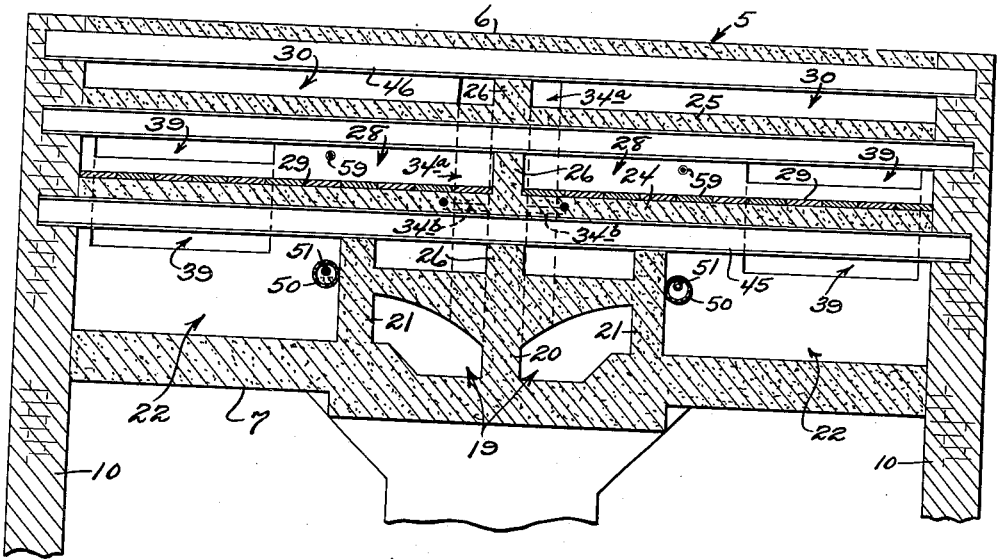
Figure 6:
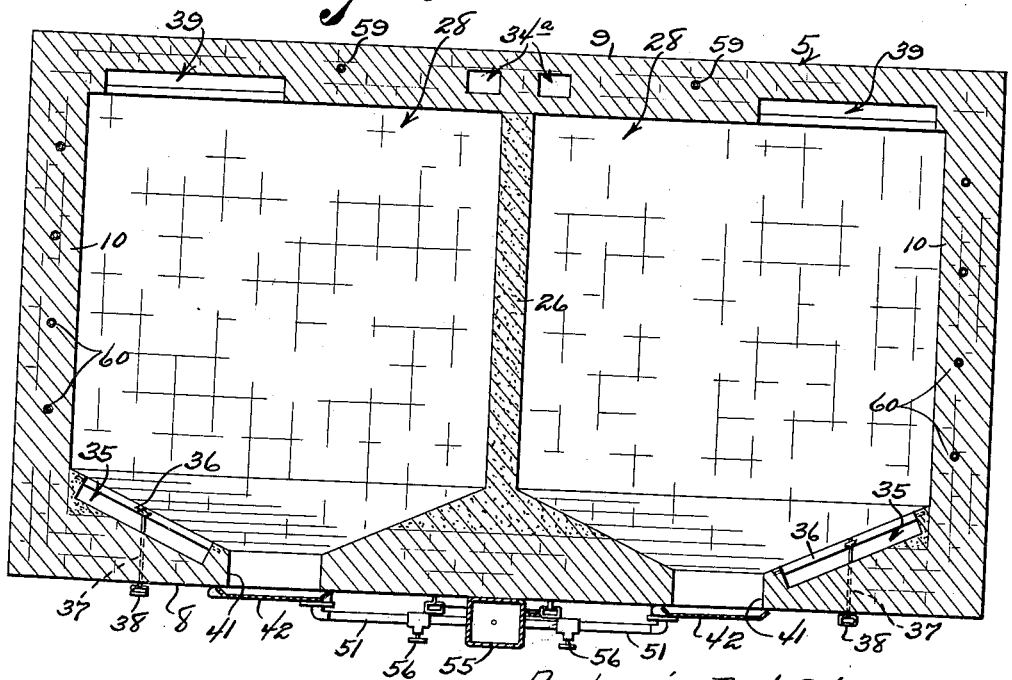

Figures 5, 6, 7 and 8 are sectional views taken on the lines 5—5, 6—6, 7—7 and 8—8 of Figure 2, respectively.

Figure 9 is a detail sectional view taken on the line 9—9 of Figure 8.

Figure 10 is a detail fragmentary longitudinal sectional view of the steam generating unit.

In practicing my invention I provide an oven 5 constructed with top, bottom, front, rear and end walls 6, 7, 8, 9 and 10 respectively. The end walls 10 extend an appreciable distance below the bottom wall 7 and serve as supports for said oven.

Centrally disposed connected sections of said bottom and front walls 7 and 8 likewise extend below the bottom wall proper and have formed therein a vertically disposed cul-de-sac 11 divided intermediate the ends thereof by a fire grate 12, the latter forming within said cul-de-sac an upper fire box 13 and a lower ash pit 14.

Passages 15 and 16 provide access to the fire box and ash pit respectively whereby fuel is introduced into said fire box and ashes removed from said ash pit. Said passages 15 and 16 are closed by doors 17 and 18 hinged on the front wall 8. The passage 16, having communication with the ash pit 14, is disposed at the lower end of said pit and ashes allowed to accumulate within said pit will smother the fire on said grate and thereby eliminate damage to the grate.

Above the bottom wall 7 the oven is formed with a horizontally extending chamber 19 having communication at the front end thereof with the upper end of the fire box 13. Said chamber is centrally divided by a transversely extending partition 20 having located on each side thereof a spaced wall 21 and which coacts with the opposite wall 21 to form a pair of spaced laterally extending compartments 22.

The partition 20 and walls 21 are connected together at their upper ends by a horizontally extending roof 22a. Above the roof 22a, the upper ends of the walls 21 coact with a coextending and intermediately spaced partition 23 to support thereabove the central portion of a lower horizontally extending partition 24 spaced subjacent from an upper parallel extending partition 25. The partitions 24 and 25 are connected, intermediate the ends thereof, with a transversely separating wall 26 coacting with the partitions 23 and 24 and the walls 8, 9 and 10 of said oven to provide a pair of baking chambers 28. The partition 24 constitutes the bases of said baking chambers and are provided with floors 29 as clearly illustrated in the drawings. The partition 25 is spaced below the top wall 6 of the oven and coacts therewith and the side, front and end walls 8, 9 and 10 to provide an outlet chamber 30 overlying said baking chambers and having an outlet port 31 at the front end thereof extending upwardly through the top wall 6.

Subjacent the roof 22a, the walls 21 are provided with spaced openings 32 having sealed therein the inner open ends 33 of a plurality of spaced and laterally extending radiators 34 positioned within the compartments 22 whereby the hot gases from the fire box are trapped within said radiators to effect radiation of heat therefrom over a considerable period of time. It is to be understood that upon firing of the oven, the hot gases enter said radiators and force the cool gases therefrom. The inner faces of the radiators are plain while the outer faces thereof are corrugated or fluted as illustrated in Figure 8 of the drawings.

The rear ends of the compartments 22 communicate with the rear lower ends of the outlet chamber 30 by means of a pair of spaced upwardly extending flues 34a formed in the rear wall 9. Suitable dampers 34b are provided within said flues 34a for controlling the gases passing upwardly therethrough.

The front corners of the oven are provided with downwardly extending flues 35 effecting communication between the compartments 22 at the bottom thereof and the baking chambers 28. Said flues are controlled by dampers 36 pivotally operable by rods 37 equipped with handles 38 without the front wall 8. When the radiators 34 are heated by the hot gases from the fire box, the air exteriorly of and surrounding said radiators and within the compartments 22 will likewise be heated and said exteriorly heated air will be conducted upwardly through flues 39 from the rear of said compartments 22 into the rear of said baking chambers 28 and is circulated through said chambers and downwardly through said flues 35 into said compartments for reheating by said radiators. Access is had to the baking chambers 28 through passages 41 extending through the front wall 8 and said passages are normally closed by doors 42 hinged to said front wall in the usual manner.

A clean-out passage 43 is also provided in said front wall above the passage 15 for permitting cleaning of the compartments 22 and said passage 32 is likewise closed by a door 44. Each of the horizontally extending partitions 24 and 25 are provided with horizontally extending spaced I-beams 45, the ends of which are supported within the side walls 10 whereby to reenforce and rigidly support said partitions. The top wall 6 has extending therethrough a plurality of spaced inverted T-beams 46, the ends of which are supported by the side walls 10 whereby to reenforce said top wall.

In the operation of the oven it is desirable in some instances to supply the baking chambers with steam and for this purpose I provide a transversely extending header 50 in each of the compartments 22 and on the rear upper ends of the radiators therein. The outer ends of the headers are connected together with a longitudinally extending pipe 51 equipped between said headers with a T 52 to which is secured a vertically extending pipe 54 located without and adjacent the front wall 8. The upper end of the pipe 54 is connected to a water reservoir 55 for supplying water to the headers as hereinafter set forth. The pipe 54 is provided with a control valve 56 whereby to regulate the quantity of water supplied to said headers.

The inwardly extending ends of the pipes 51 are closed by caps 57. Between the caps 57 and the inner or closed ends of the headers, the pipes 51 are perforated on the lower faces thereof and the upper faces of said pipes are maintained in proximity to the upper sections of the headers thereby providing subjacent the pipes 51 substantial spaces which are partially filled with sand 58 or the like. The inner ends of the headers are upwardly disposed and have connected thereto steam pipes 59, the upper ends of which communicate with the upper interior of the baking chambers at the outer sides thereof as clearly illustrated in Figures 3 and 4. The headers, intermediate the length thereof, are also provided with a plurality of horizontally disposed spaced steam pipes 60 having vertically extending end sections effecting communication with the baking chambers through the tops of the side walls thereof as clearly illustrated in Figures 3 and 4. Obviously, water discharged through the perforations of the pipes 51 on to the sand 58 within the headers will be generated into steam through the medium of the heat from the radiators 34 and said steam communicated to the baking chambers through the steam pipes 59 and 60.

From the foregoing it will be apparent that the hot gases trapped in the radiators 34 will maintain the oven in a heated condition over a considerable period of time after the fire has been drawn or banked and also enable a quick refiring of the oven in a minimum amount of time. Furthermore, it will be apparent that by circulating heated air above and below the baking chambers, hot and cold spots within the baking chambers will be eliminated, thereby maintaining said baking chambers at a uniform temperature throughout the entire areas thereof.

It is to be distinctly understood that various changes and modifications in the construction and arrangement of the parts may be resorted to without departing from the spirit of the invention or scope of the appended claims.

What I claim is:

1. A baker's oven, comprising, top, bottom, front, rear and side walls, a fire box subjacent said bottom wall, a pair of spaced laterally extending compartments arranged above said bottom wall, a plurality of spaced radiators within said compartments and having communication with said fire box whereby to receive hot gases therein from said fire box to effect heating of said compartments, and spaced baking chambers above said compartments, said rear wall provided with a pair of flues effecting communication between said compartments and said baking chambers whereby heated air from said compartments is introduced into said baking chambers, said front wall fashioned with a pair of spaced flues effecting communication between said baking chambers and said compartments and coacting with said first mentioned flues to effect circulation of heated air through said baking chambers, a horizontally disposed partition overlying said baking chambers and spaced from said top wall and coacting with the latter to form an outlet chamber, said rear wall formed with a pair of flues effecting communication between said fire box and said outlet chamber for circulating heated gases over said baking chambers.

2. A baker's oven, comprising, top, bottom, front, rear and side walls, a fire box subjacent said bottom wall, a pair of spaced laterally extending compartments arranged above said bottom wall, a plurality of spaced radiators within said compartments and having communication with said fire box whereby to receive hot gases therein from said fire box to effect heating of said compartments, spaced baking chambers above said compartments, said rear wall provided with a pair of flues effecting communication between said compartments and said baking chambers whereby heated air from said compartments is introduced into said baking chambers, said front wall fashioned with a pair of spaced flues effecting communication between said baking chambers and said compartments and coacting with said first mentioned flues to effect circulation of heated air through said baking chambers, a horizontally disposed partition overlying said baking chambers and spaced from said top wall and coacting with the latter to form an outlet chamber, said rear wall formed with a pair of flues effecting communication between said fire box and said outlet chamber for circulating heated gases over said baking chambers, and dampers within said first mentioned flues for maintaining gases from said fire box within said radiators.

3. A baker's oven, comprising, top, bottom, front, rear and side walls, a fire box subjacent said bottom wall, a pair of spaced laterally extending compartments arranged above said bottom wall, a plurality of spaced radiators within said compartments and having communication with said fire box whereby to receive hot gases therein from said fire box to effect heating of said compartments, spaced baking chambers above said compartments, said rear wall provided with a pair of flues effecting communication between said compartments and said baking chambers whereby heated air from said compartments is introduced into said baking chambers, said front wall fashioned with a pair of spaced flues effecting communication between said baking chambers and said compartments and coacting with said first mentioned flues to effect circulation of heated air through said baking chambers, a horizontally disposed partition overlying said baking chambers and spaced from said top wall and coacting with the latter to form an outlet chamber, said rear wall formed with a pair of flues effecting communication between said fire box and said outlet chamber for circulating heated gases over said baking chambers, and dampers within said second mentioned flues for maintaining heated air within said baking chambers.

4. A baker's oven, comprising, top, bottom, front, rear and side walls, a fire box subjacent said bottom wall, a pair of spaced laterally extending compartments arranged above said bottom wall, a plurality of spaced radiators within said compartments and having communication with said fire box whereby to receive hot gases therein from said fire box to effect heating of said compartments, spaced baking chambers above said compartments, said rear wall provided with a pair of flues effecting communication between said compartments and said baking chambers whereby heated air from said compartments is introduced into said baking chamber, said front wall fashioned with a pair of spaced flues effecting communication between said baking chambers and said compartments and coacting with said first mentioned flues to effect circulation of heated air through said baking chambers, a horizontally disposed partition overlying said baking chambers and spaced from said top wall and coacting with the latter to form an outlet chamber, said rear wall formed with a pair of flues effecting communication between said fire box and said outlet chamber for circulating heated gases over said baking chambers, dampers within said first mentioned flues for maintaining gases from said fire box within said radiators, and dampers within said second mentioned flues for maintaining heated air within said baking chambers.

5. A baker's oven, comprising, top, bottom, front, rear and side walls, a fire box subjacent said bottom wall, a heating chamber arranged above said bottom wall and formed with a pair of spaced laterally extending compartments and communicating with said fire box, a plurality of spaced radiators within said compartments and having communication with said fire box whereby to receive hot gases therein from said fire box to effect heating of said compartments, and spaced baking chambers above said compartments, said rear wall provided with a pair of flues effecting communication between said compartments and said baking chambers whereby heated air from said compartments is introduced into said baking chambers, said front wall fashioned with a pair of spaced flues effecting communication between said baking chambers and said compartments and coacting with said first mentioned flues to effect circulation of heated air through said baking chambers, a horizontally disposed partition overlying said baking chambers and spaced from said top wall and coacting with the latter to form an outlet chamber, said rear wall formed with a pair of flues effecting communication between said heating chamber and said outlet chamber for circulating heated air over said baking chambers.

6. The elements of claim 5 as set forth and defined therein including dampers within said first mentioned flues for maintaining gases from said fire box within said radiators.

ANTONIO DEL SIGNORE.